United States Patent
Fellhauer et al.

(10) Patent No.: US 7,293,799 B2
(45) Date of Patent: Nov. 13, 2007

(54) GAS BAG MODULE

(75) Inventors: Joachim Fellhauer, Nilkheim (DE); Markus Keutz, Rossdorf (DE); Martin Kreuzer, Kleinwallstadt (DE); Michael Lehmann, Aschaffenburg (DE); Marcus Magoley, Aschaffenburg (DE); Michael Schneider, Sulzbach (DE)

(73) Assignee: TRW Automotive Safety Systems GmbH, Aschaffenburg (DE)

( * ) Notice: Subject to any disclaimer, the term of this patent is extended or adjusted under 35 U.S.C. 154(b) by 12 days.

(21) Appl. No.: 11/407,155

(22) Filed: Apr. 19, 2006

(65) Prior Publication Data

US 2006/0237956 A1    Oct. 26, 2006

(30) Foreign Application Priority Data

Apr. 20, 2005    (DE) ................. 20 2005 006 330 U

(51) Int. Cl.
*B60R 21/16*   (2006.01)
(52) U.S. Cl. ................. 280/743.2; 280/743.1
(58) Field of Classification Search ............. 280/730.1, 280/731, 732, 739, 741, 742, 743.1, 743.2
See application file for complete search history.

(56) References Cited

U.S. PATENT DOCUMENTS

| 6,581,964 | B2 * | 6/2003 | Braunschadel | 280/743.2 |
|---|---|---|---|---|
| 6,749,217 | B2 * | 6/2004 | Damian et al. | 280/734 |
| 6,802,534 | B2 * | 10/2004 | Neupert | 280/743.1 |
| 6,869,103 | B2 * | 3/2005 | Ryan et al. | 280/743.2 |
| 6,918,614 | B2 * | 7/2005 | Ryan | 280/743.2 |
| 6,932,384 | B2 * | 8/2005 | Waid et al. | 280/739 |
| 7,021,657 | B2 * | 4/2006 | Kassman et al. | 280/743.2 |
| 7,192,053 | B2 * | 3/2007 | Thomas | 280/739 |
| 2002/0030355 | A1 * | 3/2002 | Braunschadel | 280/743.2 |
| 2002/0036400 | A1 * | 3/2002 | Winters et al. | 280/743.2 |
| 2004/0075261 | A1 * | 4/2004 | Damian et al. | 280/743.2 |

(Continued)

FOREIGN PATENT DOCUMENTS

DE    19733599    2/1999

(Continued)

*Primary Examiner*—Paul N. Dickson
*Assistant Examiner*—Toan C. To
(74) *Attorney, Agent, or Firm*—Tarolli, Sundheim, Covell & Tummino LLP

(57) ABSTRACT

A gas bag module (10) includes a gas bag (12), the gas bag having a front wall (14) facing an occupant (16) in an inflated state of said gas bag (12) and being engaged by a first end (18) of a destructible retaining element (20), the retaining element (20) at least partially preventing an unhindered motion of the front wall (14) when the gas bag (12) is inflated. The gas bag module further includes a gas generator (22) for filling the gas bag (12), the gas generator (22) having a first discharge section (24) for a through flow of a first quantity of gas. The gas generator (22) has a separate, second discharge section (26), which can have a second quantity of gas flow through it in a way that is selectively independent of a release of the first quantity of gas or has a time delay with respect to the release of the first quantity of gas, the second quantity of gas being hot gas, which flows to the retaining element (20) through the second discharge section (26) so as to cause a destruction of the retaining element (20).

9 Claims, 2 Drawing Sheets

U.S. PATENT DOCUMENTS

2004/0104564 A1* 6/2004 Hawthorn et al. ....... 280/743.2
2004/0113404 A1* 6/2004 Ryan et al. ................. 280/735
2005/0057030 A1   3/2005 Fischer et al.
2006/0186655 A1* 8/2006 Ehrke ....................... 280/743.1
2006/0232049 A1* 10/2006 Abe ............................ 280/729
2006/0249943 A1* 11/2006 Bauer et al. ............. 280/743.2

FOREIGN PATENT DOCUMENTS

| | | |
|---|---|---|
| DE | 19837749 | 3/2000 |
| DE | 20010542 | 11/2000 |
| EP | 1155924 | 11/2001 |
| EP | 1323594 | 7/2003 |
| EP | 1426245 | 6/2004 |
| JP | 2002211348 | 7/2002 |

* cited by examiner

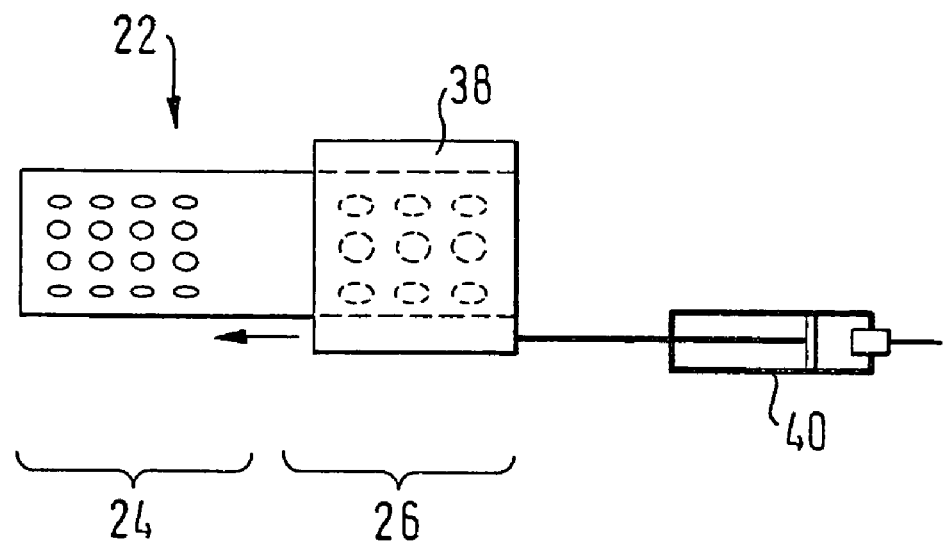
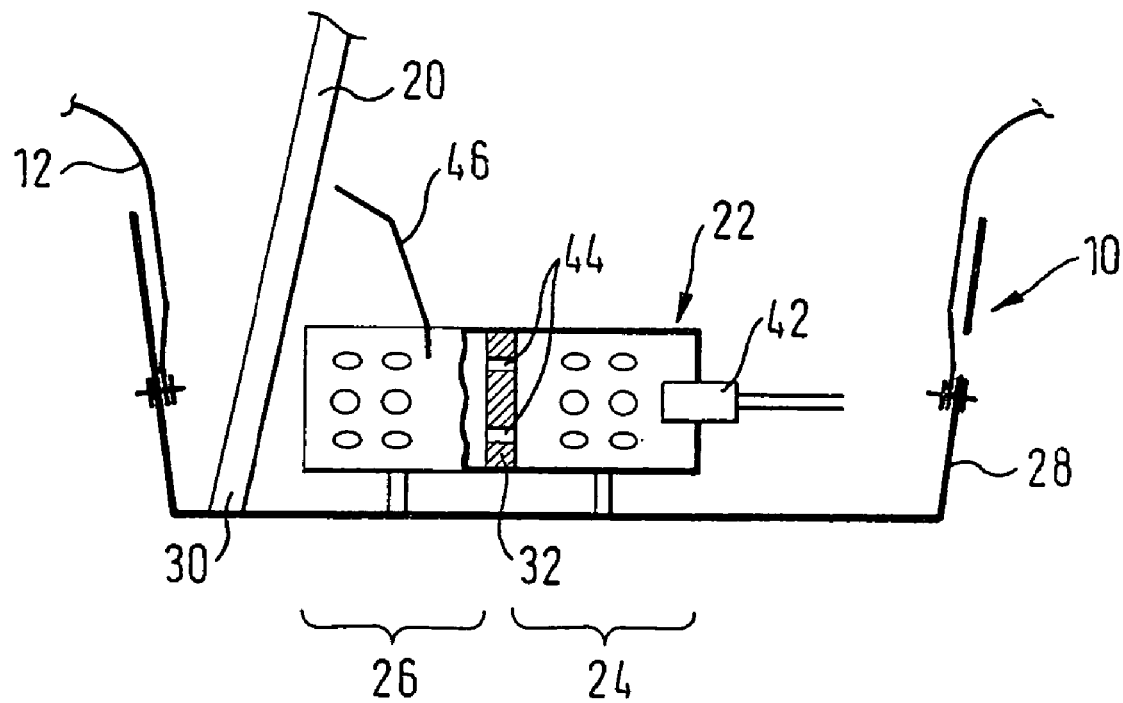

GAS BAG MODULE

TECHNICAL FIELD

The invention relates to a gas bag module having a gas bag, the gas bag having a front wall that in the inflated state of the gas bag faces an occupant. A first end of a destructible retaining element engages the front wall, the retaining element at least partially preventing an unhindered movement of the front wall when the gas bag is inflated. In addition, the gas bag module has a gas generator for filling the gas bag, the gas generator having a first discharge section for the through flow of a first quantity of gas.

BACKGROUND OF THE INVENTION

Gas bag modules of this type are known from the prior art. They have the advantage that the gas bag, seen from the point of view of the occupant, initially presents a large impact surface instead of great depth. The large impact surface in many seating positions of the occupant assures very good restraint conditions. Moreover, the front wall, which moves towards the occupant, is slowed by the retaining element at an early point in time.

However, at especially high vehicle velocities or in the case of especially heavy occupants, it is possible that the available plunge depth needs to be increased. Therefore, thought has been given to destroying the retaining element in the course of the inflation process, so that the gas bag has greater depth and therefore the plunge path for an occupant is longer. Several passive and active approaches are familiar for detaching or destroying the retaining element.

Thus, for example, the retaining element can have a predetermined breaking point at which the retaining element ruptures as a function of the interior pressure of the gas bag. Passive solutions of this type that are realized through predetermined breaking points, tear seams, etc., are highly subject to tolerances. On the one hand, the tolerances are generated in manufacturing the predetermined breaking points or tear seams themselves, but they can also be generated in the discharging of gas generators. The other approach to detach or destroy the retaining element are active systems, in which cutting devices or attachment bolts of the retaining element are set in motion. These systems require an additional actuator and are therefore complicated and expensive.

The generic document EP 1 155 924 A2 discloses both active as well as passive approaches for detaching or destroying the retaining element. Among others, an embodiment is shown in which a catch strap extends through a diffuser and past the discharge openings of a gas generator. When the gas generator is activated, hot gas flows onto the catch strap, which is partially destroyed in the process. In this context, the disadvantage is that the destruction of the catch strap is directly coupled to the inflation process of the gas bag.

It is an object of the present invention to reliably and timeably bring about a destruction of a gas bag retaining element.

BRIEF SUMMARY OF THE INVENTION

According to the invention, a gas bag module includes a gas bag, the gas bag having a front wall facing an occupant in an inflated state of said gas bag and being engaged by a first end of a destructible retaining element, the retaining element at least partially preventing an unhindered motion of the front wall when the gas bag is inflated. The gas bag module further includes a gas generator for filling the gas bag, the gas generator having a first discharge section for a through flow of a first quantity of gas. The gas generator has a separate, second discharge section, which can have a second quantity of gas flow through it in a way that is selectively independent of a release of the first quantity of gas or has a time delay with respect to the release of the first quantity of gas, the second quantity of gas being hot gas, which flows to the retaining element through the second discharge section so as to cause a destruction of the retaining element.

In the hot-gas generators currently in use, the gas that is released from the gas generator attains very high temperatures. At these temperatures, as a result of the gas flow encountering a retaining element, a destruction of the retaining element that is reliable, rapid, and little affected by tolerances is assured in the area of the incoming flow. Furthermore, the hot gas flows to the retaining element via a discharge section that can be released under varying predeterminable conditions, i.e., selectively. In this way, the time point of the destruction of the retaining element can also be preset.

In preferred embodiments, the retaining element is a meltable catch strap. By using a material that is non-flammable but meltable, it is possible to achieve the at least partial destruction of the retaining element by hot gas in an especially rapid and risk-free manner.

A gas guiding device can be provided on the second discharge section of the gas generator. This gas guiding device ensures that the escaping hot gas flows in a concentrated manner onto the retaining element and therefore causes an especially rapid destruction of the retaining element.

Preferably, a second end of the retaining element is attached directly to the second discharge section of the gas generator. In this way, there is no need for a gas guiding device, because the retaining element is impinged by hot gas in any case when the second discharge section has gas flowing through it.

In one especially preferred embodiment, the gas generator is a multi-stage gas generator having a separately ignitable hot-gas stage, which releases the second quantity of gas. This is especially advantageous because the second discharge section can be assigned very simply to a gas generator stage and has hot gas flow through it only when this stage is ignited.

In this context, this embodiment makes it possible to activate the ignition device of the hot-gas stage using a sensor-dependent control unit. In this embodiment, the decision is reached as a function of parameters, as to whether and when the retaining element is to be detached and an additional quantity of gas is to flow into the gas bag.

In a further embodiment, the second discharge section is closed off by a cover that can be moved such that it releases the second discharge section. In this embodiment, a one-stage gas generator may be used and it is necessary to provide a passive triggering means such as a tension band or an active triggering means such as a pyrotechnic drive in order to move the cover as a function of the sensor.

In a further embodiment, the gas generator has an ignition device, which ignites a first quantity of fuel in order to release the first quantity of gas, a second quantity of fuel being activated by ignition transfer in order to generate the second quantity of gas. In this way, a certain time delay is assured between the beginning of the gas bag deployment and the beginning of the at least partial destruction of the retaining element.

In this embodiment, it is also possible to provide for an ignition transfer retarder, which sets the time delay between the ignition of the first quantity of fuel and the ignition of the second quantity of fuel. Using this retarder, it is possible to optimize the deployment process of the gas bag temporally.

BRIEF DESCRIPTION OF THE DRAWINGS

FIG. 2 depicts a schematic representation of a gas generator for the gas bag module according to the present invention in accordance with a second embodiment; and FIG. 3 depicts a schematic section through a gas bag module according to the present invention in accordance with a third embodiment.

DETAILED DESCRIPTION OF THE PREFERRED EMBODIMENTS

Figure 1:
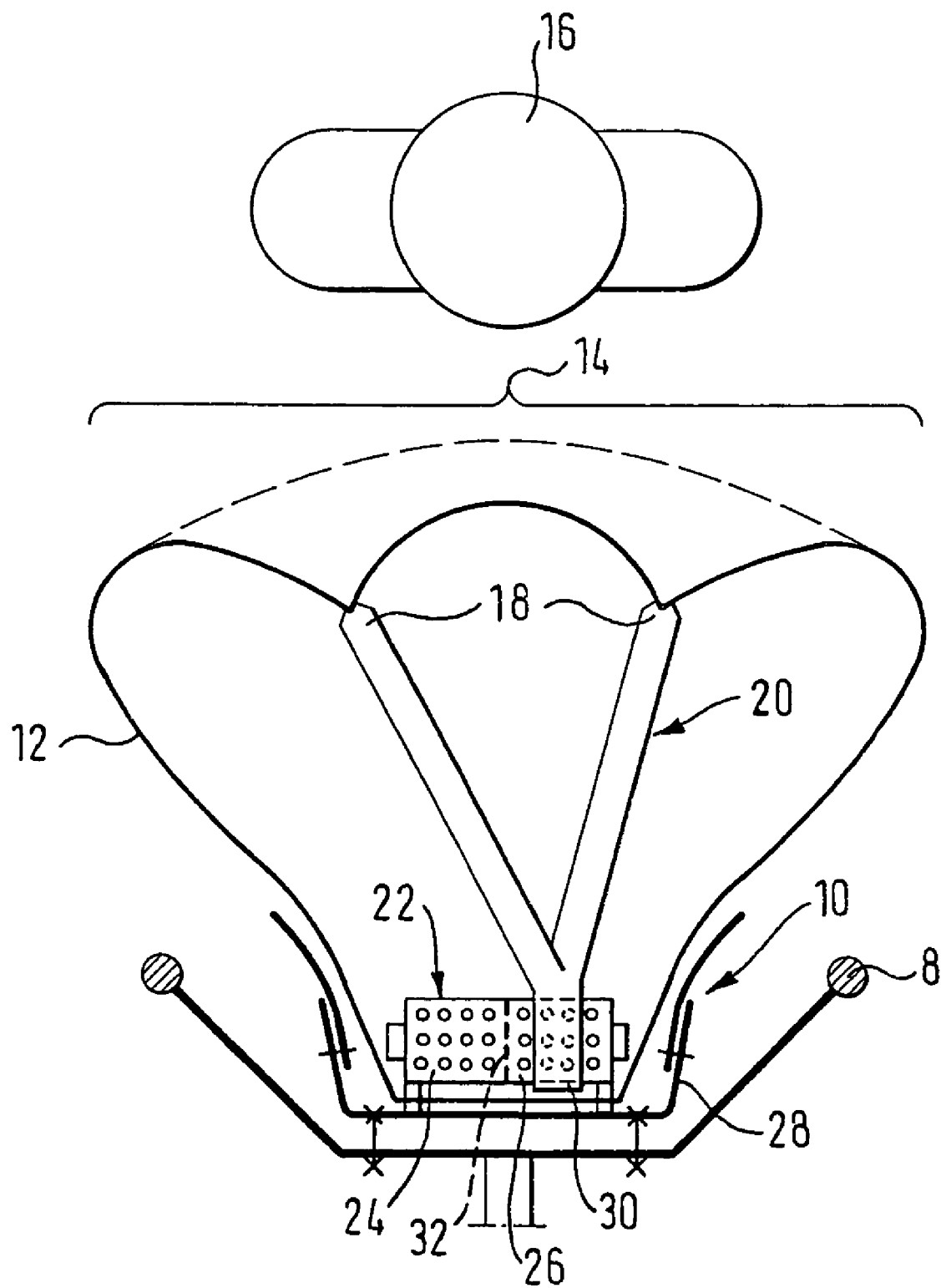
FIG. 1 depicts a schematic section through a first embodiment of the gas bag module according to the present invention.

FIG. 1 is a sectional view of a steering wheel 8 having a gas bag module 10 but it is also possible to arrange gas bag module 10 at other locations in the vehicle interior, for example, in the passenger-side area. Gas bag module 10 has a gas bag 12 having a front wall 14, which in the inflated state of the gas bag faces an occupant 16 and which is engaged by a first end 18 of a destructible retaining element 20, which at least partially prevents an unhindered motion of front wall 14 when gas bag 12 is inflated. A gas generator 22 for filling gas bag 12 has a first discharge section 24 for the through flow of a first quantity of gas and a separate, second discharge section 26, which has a second quantity of gas flow through it in a way that is selectively independent of the release of the first quantity of gas or that has a time delay with respect to the release of the first quantity of gas, the second quantity of gas being hot gas, which flows to retaining element 20 through second discharge section 26 in order to cause the destruction of retaining element 20.

Gas generator 22 is configured in FIG. 1 as a multi-stage tubular gas generator. It is subdivided by a wall 32 into a first chamber having first discharge section 24 and a second chamber having second discharge chamber 26. The first stage of the gas generator is a cold-gas or hot-gas stage, in response to whose activation gas flows out of the first chamber and brings gas bag 12 into a first deployment position, as depicted in FIG. 1. The second stage is a separately ignitable hot-gas stage, hot gas flowing into gas bag 12 from the second chamber via second discharge section 26.

An ignition device, which activates the hot-gas stage for releasing the second quantity of gas, is advantageously controlled as a function of sensors. In this way, a destruction of retaining element 20 can only be triggered when necessary, i.e., for example, in response to high vehicle velocities or heavy vehicle occupants.

In FIG. 1, gas bag 12 has already emerged from a module housing 28 and is in the first deployment position (shown as a solid line), in which front wall 14 of gas bag 12 is restrained by a first end 18 of retaining element 20.

Retaining element 20 in this case is a meltable catch strap, for example, made of a gas bag fabric that is not coated with heat-protective material. First end 18 is divided along the course of the catch strap, so that the catch strap restrains front wall 14 at two points. A second end 30 of retaining element 20 directly contacts second discharge section 26 of gas generator 22. In the case of a meltable catch strap, this is particularly easy to accomplish by winding second end 30 of the catch strap around the gas generator 22. Alternatively, however, second end 30 can also be attached to module housing 28.

When the hot gas is discharged via second discharge section 26, retaining element 20 is partially melted at its second end 30, i.e., precisely where it touches on gas generator 22. Due to the melting and the tensile force as a result of the gas bag interior pressure, retaining element 20 loses its restraining effect for front wall 14, so that gas bag 12 occupies a second deployment position (shown as a dashed line). It is especially advantageous that the second quantity of gas is dimensioned such that the inflowing hot gas, which brings about a destruction of retaining element 20, provides an approximately constant gas bag interior pressure. For this purpose, the second quantity of gas must roughly correspond to the volume differential in the gas bag between the first, restrained deployment position and the second, complete deployment position.

FIG. 2 shows a gas generator 22 according to a second embodiment of the gas bag module. Second discharge section 26 is closed off by a cover 38, which can be moved so that it releases second discharge section 26. First discharge section 24 is not influenced by the motion of cover 38, or it can be closed off completely or partially by cover 38 as a consequence of the motion. In the example shown, cover 38 is a sleeve that surrounds gas generator 22 and that can be moved towards the first discharge section.

In this embodiment, it is therefore possible to use a cost-effective, single-stage gas generator 22. Nevertheless, a triggering device 40 must be provided, which moves cover 38. Triggering device 40 in this context can be executed so as to be passive or active. A passive triggering device is, for example, a tension band, whose one end is connected to front wall 14 of gas bag 12 and whose second end is connected to cover 38, so that cover 38 is moved as a function of the deployment state of the gas bag 12. In FIG. 2, a pyrotechnically driven piston/cylinder unit is represented as an example of an active triggering device. Although this implies an increased expense as a consequence of an additional necessary ignition circuit, it also makes it possible to release retaining element 20 independently.

In a third embodiment of the gas bag module according to FIG. 3, gas generator 22 has an ignition device 42, which ignites a first quantity of fuel, which releases the first quantity of gas. A second quantity of fuel for releasing the second quantity of gas is activated by ignition transfer. For this purpose, an ignition transfer device 44 is integrated in wall 32 of gas generator 22. By using a retarder, the ignition transfer process can be timed so that gas bag 12 deploys optimally.

To ensure that the stream of the second quantity of gas is directed onto retaining element 20, in FIG. 3 a gas guiding device is provided in the form of a sheet metal part 46 on second discharge section 26 of gas generator 22.

The invention claimed is:

1. A gas bag module (10) having
a gas bag (12), said gas bag having a front wall (14) facing an occupant (16) in an inflated state of said gas bag (12) and being engaged by a first end (18) of a destructible retaining element (20), said retaining element at least partially preventing an unhindered motion of said front wall (14) when said gas bag (12) is inflated, and a gas generator (22) for filling said gas bag (12), having a first discharge section (24) for a through flow of a first quantity of gas, said gas generator (22) having a separate, second discharge section (26), which can have a second quantity of gas flow through it in a way that is one of selectively independent of a release of said first quantity of gas and delayed in time with respect to said release of said first quantity of gas, said second quantity of gas being hot gas, which flows to said retaining element (20) through said second discharge section (26) so as to cause a destruction of said retaining element (20).

2. The gas bag module (10) as recited in claim 1, wherein said retaining element (20) is a meltable catch strap.

3. The gas bag module (10) as recited in claim 1, wherein a gas guiding device is provided on said second discharge section (26) of said gas generator (22).

4. The gas bag module (10) as recited in claim 1, wherein a second end (30) of said retaining element (20) is attached directly to said second discharge section (26) of said gas generator (22).

5. The gas bag module (10) as recited in claim 1, wherein said gas generator (22) is a multi-stage gas generator having a separately ignitable hot-gas stage, said ignitable hot-gas stage releasing said second quantity of gas.

6. The gas bag module (10) as recited in claim 5, wherein an ignition device of said hot-gas stage can be activated using a sensor-dependent control unit.

7. The gas bag module (10) as recited in claim 1, wherein said second discharge section (26) is closed off by a cover (38) that can be moved such that it releases said second discharge section (26).

8. The gas bag module (10) as recited in claim 1, wherein said gas generator (22) has an ignition device (42), said ignition device igniting a first quantity of fuel in order to release said first quantity of gas, and a second quantity of fuel is activated by ignition transfer in order to produce said second quantity of gas.

9. The gas bag module (10) as recited in claim 8, wherein an ignition transfer retarder is provided that sets a time delay between an ignition of said first quantity of fuel and an ignition of said second quantity of fuel.

* * * * *